March 5, 1963
E. J. DOUGLAS
3,080,045
REMOVABLE SCREW ASSEMBLY
Filed Aug. 3, 1959
3 Sheets-Sheet 1
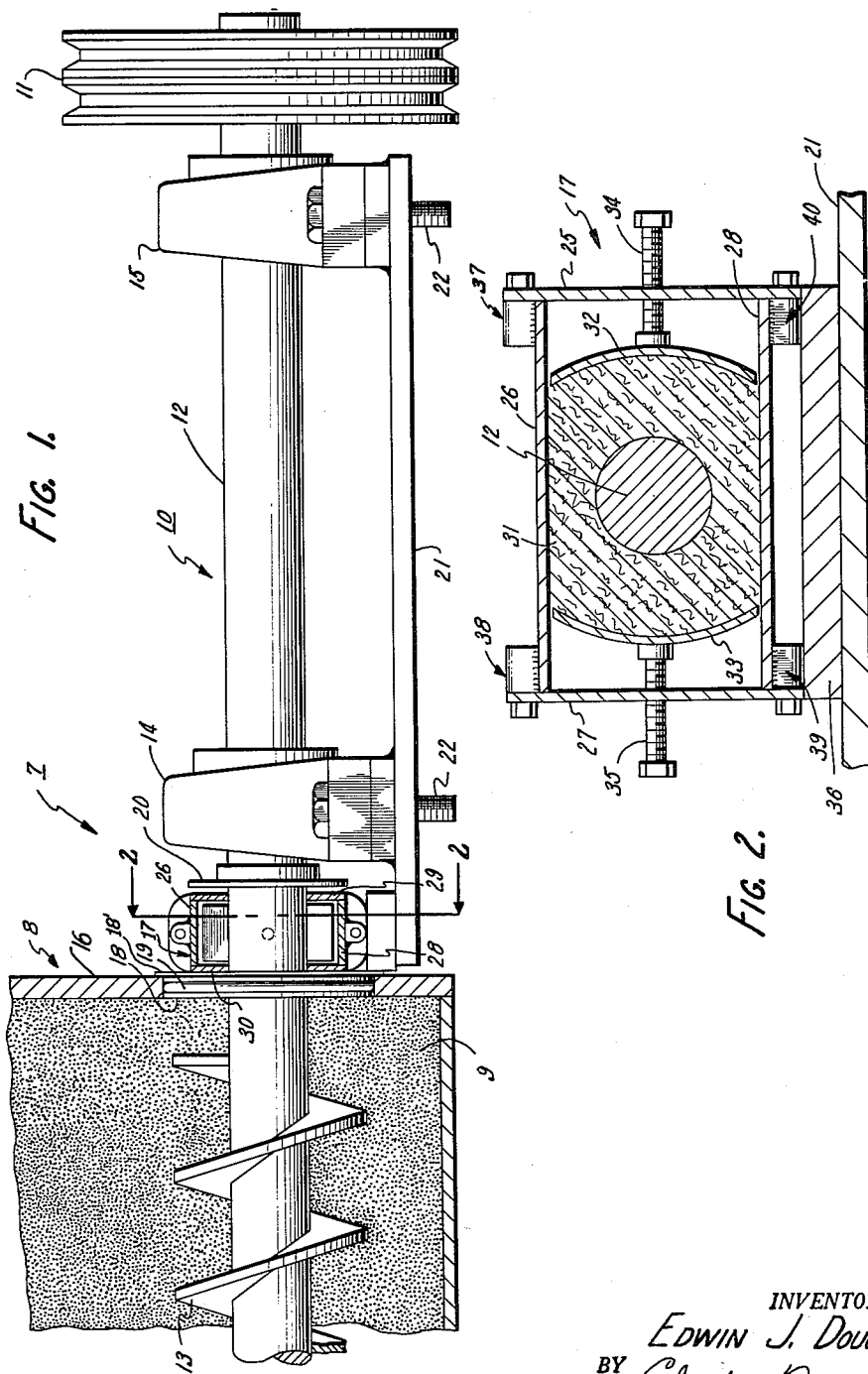
INVENTOR.
EDWIN J. DOUGLAS
BY
Christie Parker & Hale
ATTORNEYS March 5, 1963     E. J. DOUGLAS     3,080,045
REMOVABLE SCREW ASSEMBLY
Filed Aug. 3, 1959     3 Sheets-Sheet 2

INVENTOR.
EDWIN J. DOUGLAS
BY Christie, Parker & Hale
ATTORNEYS

March 5, 1963

E. J. DOUGLAS 3,080,045

REMOVABLE SCREW ASSEMBLY

Filed Aug. 3, 1959

INVENTOR.
EDWIN J. DOUGLAS
BY
Christie Parker & Hale
ATTORNEYS

United States Patent Office 3,080,045
Patented Mar. 5, 1963

3,080,045
REMOVABLE SCREW ASSEMBLY
Edwin J. Douglas, Whittier, Calif., assignor to H. L. Stoker Company, Claremont, Calif., a corporation of California
Filed Aug. 3, 1959, Ser. No. 831,201
13 Claims. (Cl. 198—213)

The present invention relates to a removable screw assembly which may be utilized in a material handling device such as is disclosed in my co-pending U.S. patent application, Serial No. 805,397, filed April 10, 1959 and assigned to the H. L. Stoker Company, the assignee of the present application.

It has been the conventional practice in material handling devices of the screw conveyor type to provide for the screw conveyor to be permanently attached to the material handling device. This practice has been followed since, heretofore, removable screw assemblies have had no utility, inasmuch as the screw assembly for each material handling device was required to be especially designed therefor, as is set out more particularly in my aforesaid co-pending application, Serial No. 805,397. However, in the material handling device of my co-pending application, the use of a removable screw assembly is particularly advantageous, in that by utilizing such an assembly a wide variety of types of material may be handled.

According to the present invention a removable screw assembly consists of a drive shaft, which has a screw flight and a drive connection attached to opposite ends thereof. The drive shaft extends into a U-trough of the material handling device through an aperture in the U-trough sufficiently large to permit the screw to be withdrawn therethrough. This aperture is closed during the operation of the device by means of a seal, which preferably contains an O-ring so as to insure a tight closure. External of the U-trough the drive shaft is enclosed by the packing seal in order to prevent the transport of the material being handled along the drive shaft toward the drive connection. The transfer of this material is further inhibited by using a slinger ring, which is mounted on the drive shaft on the drive connection side of the packing seal. The drive shaft itself is supported by at least two antifriction support members, which may be ball or roller bearings, for example, positioned between the slinger ring and the drive connection. The drive connection may, for example, consist of a pulley.

When certain types of antifriction support members are utilized, a housing enclosing the space about the shaft between the antifriction support members is used. In one embodiment in which this housing is used, a lubricant is contained within the housing so as to lubricate the drive shaft itself between the antifriction support members. Such lubrication provides a washing effect to remove any material which may be transported along the drive shaft. In the embodiment utilizing the housing to connect the antifriction support members, the removable screw assembly is preferably attached to the material handling device by a conventional clamp. Alternatively a base plate may be utilized to which the antifriction support members are attached, the base plate being, for example, bolted to the material handling device.

The invention may be more readily understood by referring to the accompanying drawings in which:

FIGURE 1 is a view, partially in section, of a removable screw assembly according to the invention;

FIGURE 2 is a sectional view taken along lines 2—2 of FIG. 1 and showing the packing seal of the removable screw assembly.

Figure 3:
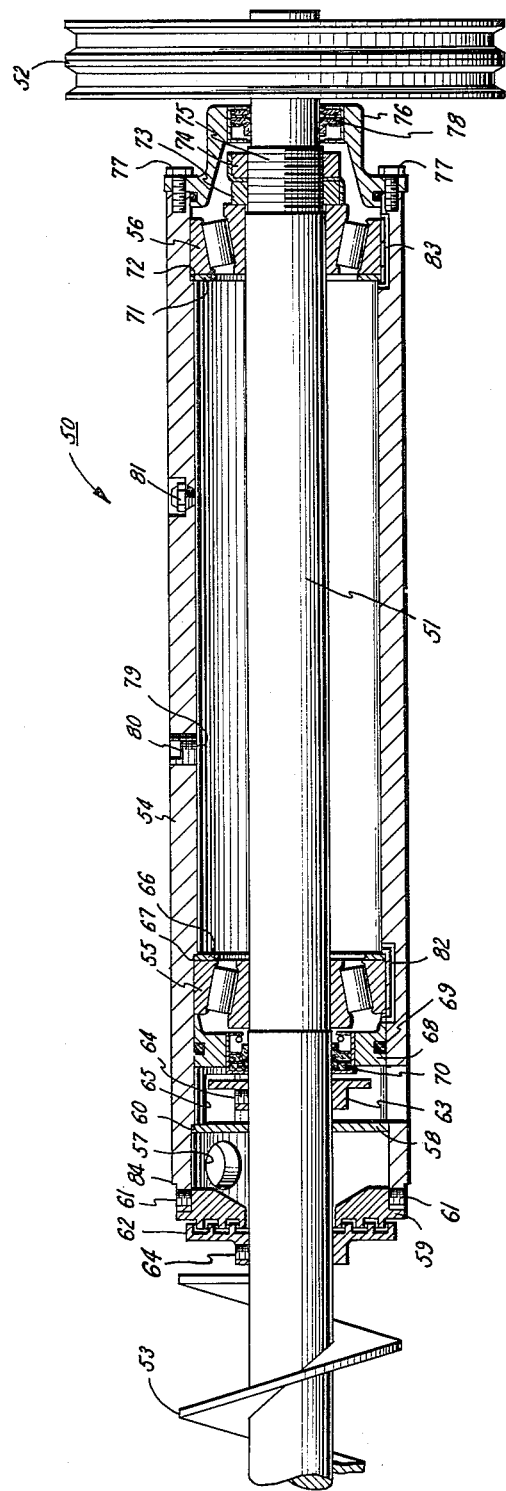
FIGURE 3 is a sectional view of an alternate embodiment of the removable screw assembly of the invention in which a housing is utilized to connect two antifriction support members.

Referring now to FIGURE 1, a material handling device 7 has a U-trough 8 containing material 9 to be handled by a removable screw assembly 10. A drive connection 11 for the removable screw assembly 10 consists of a pair of pulleys attached to a drive shaft 12 at one end thereof, a screw flight 13, only a portion of which is shown in FIG. 1, being attached to the other end of the shaft 12. Two antifriction support members 14 and 15 enclose the shaft 12 between the drive connection 11 and the screw flight 13. The antifriction support members 14 and 15 may, for example, be SKF type SY 108 ball bearings enclosed in suitable pillow blocks.

A U-trough rear wall 16, through which the drive shaft 12 extends, is the rear wall of the U-trough of a material handling device such as is illustrated in FIGURE 1 of my aforesaid co-pending application, Serial No. 805,397. The wall 16 has an aperture therein through which the shaft 12 extends. This aperture is of sufficient diameter to allow the screw flight 13 to be withdrawn therethrough. A packing seal 17 (shown in section) encloses the shaft 12 adjacent this aperture in the wall 16. The packing seal 17 is attached to an aperture seal ring 18 by a connecting flange 18'. The connecting flange 18' rides against the wall 16 so as to also act as a stop when the ring 18 is inserted into the aperture. The ring 18 forms a seal with the aperture by means of an O-ring 19 which extends outwardly from the periphery of the ring 18.

A slinger ring 20 is mounted on the drive shaft 12 between the packing seal 17 and the antifriction support member 14. A base plate 21 is utilized to hold the packing seal 17 and the antifriction support members 14 and 15 in a fixed relationship to each other. A pair of bolts 22 extend through the pillow blocks of the antifriction support members 14 and 15 and into the base plate 21 and are utilized to attach the antifriction support members 14 and 15 to the base plate 21. The base plate is bolted to the material handling device.

FIGURE 2 is a sectional view taken along the lines 2—2 of FIG. 1 and shows the packing seal 17. The packing seal 17 has four sides 25, 26, 27 and 28 (FIG. 2) and two end pieces 29 and 30 (FIG. 1), which together form an enclosed box type structure. Packing 31, which consists, for example, of wool or shredded Teflon, is contained within the packing seal. The packing 31 is held against the drive shaft 12 by means of two movable compression members 32 and 33. The movable compression members 32 and 33 are moved by means of two bolts 34, 35, threaded through the walls 25 and 27, respectively. The packing seal 17 is mounted on the base plate 21 by means of a mounting plate 36 to which the packing seal assembly is attached. The packing seal assembly is held together by four bolt and threaded receptacle combinations 37, 38, 39 and 40, which are mounted on the four sides of the packing seal, the sides 25 and 27 being attached to the base plate 21 by welding, for example.

Rotation of the drive shaft 12 is accomplished by a conventional belt drive (not shown) engaging the pulleys 11, (FIG. 1). The material 9 being handled, which is contained in the U-trough 8 is transported by means of the rotation of the screw flight 13 away from the U-trough wall 16. However, a certain amount of the material tends to pass along the drive shaft 12 in the direction of the drive connection 11, inasmuch as the sealing ring 18 is stationary and, therefore, does not actually seal the drive shaft itself, but rather the aperture in the wall 16. The material can therefore pass along the drive shaft 12 to the packing seal 17. The majority of such material is trapped by the packing 31 of the packing seal 17. However, a small portion of the material will pass through the packing seal 17 and reach the slinger ring 20. The slinger ring is firmly attached to the drive shaft 12. Material reaching the slinger ring 20 must then pass around the ring in order to continue down the drive shaft 12 toward the drive connection 11. The slinger ring 20 rotates with the rotation of the drive shaft 12 and therefore imparts a centrifugal movement vector to the material reaching it. Thus it is almost impossible for any material to continue moving down the drive shaft 12 beyond the slinger ring 20. However, if the material being handled is particularly light, the amount of such material which would move past the slinger ring 20 and into the antifriction members 14 and 15 may be appreciable. Therefore, in such an application it is often desirable to provide a means by which the drive shaft itself is washed in order to clean the material from the shaft. Otherwise the antifraction members may become fouled.

FIGURE 3 is a sectional view of an alternate embodiment of the invention which provides a means by which the drive shaft is washed to prevent fouling of the antifriction support members. By utilizing a lubricant for such washing, the lubrication of the antifriction support members is assured. In the removable screw assembly 50 of FIG. 3, a drive shaft 51 has a drive connection 52, illustrated as being identical to the drive connection 11 of FIG. 1, attached thereto at one end thereof. At the opposite end a portion of a screw flight 53 is shown. The drive shaft between the drive connection 52 and the screw flight 53 is enclosed by a housing 54, within which two antifriction members 55 and 56, illustrated as roller bearings, are mounted so as to enclose the drive shaft 51.

A packing seal is formed by packing (not shown) inserted through an aperture 57 in the housing 54 adjacent the screw flight 53, the packing being contained between first and second annular rings 58 and 59. A first shoulder 60 on the inner periphery of the housing 54 retains the first annular ring 58. A pair of set screws 61 are contained in threaded bores of the housing 54 and hold the second annular ring 59 in position. The face of the second annular ring 59 adjacent the screw flight 53 has three annular grooves thereon which engage three annular grooves of a dirt seal ring 62. The dirt seal ring 62 is attached to the drive shaft 51 by means of a set screw 63 so as to engage the drive shaft 51. The dirt seal ring 62 thus rotates with the drive shaft 51 while the second annular ring 59 remains stationary.

A slinger ring 63 is mounted on and fixed to the drive shaft 51 by means of a set screw 64. Access to the set screw 64 is had through a second aperture 65 in the housing 54.

The first antifriction member 55 is held in position with respect to the direction of the drive connection 52 by means of a back-up ring 66 which engages a shoulder 67 of the housing 54. To the opposite side, the first antifriction member 55 is held in position by an oil seal mounting ring 68 which includes on its outer periphery an O-ring seal 69. An inner periphery felt seal 70 seals the antifriction member 55 with respect to the drive shaft 51. The oil seal mounting ring 68 is itself held in position by a set screw (not shown) extending through and engaging the housing 54 so as to bear against the oil seal mounting ring 68.

The second antifriction support member 56 is held in position with respect to the direction of the screw flight 53 by means of a back-up ring 71 which engages a shoulder 72 of the housing 54. With respect to the direction of the drive connection 52, the second antifriction support member 56 is held in position by means of a lock washer 73 and a lock nut 74 which engage a threaded portion 75 of the drive shaft 51. The housing 54 is sealed with respect to the direction of the drive connection 52 by means of an end cover 76 which is attached to the housing 54 by bolts 77. The end cover 76 includes a conventional felt seal 78, which engages and seals the drive shaft 51.

A lubricant, S.A.E. 20 oil, for example, is poured into the space between the two antifriction members 55 and 56 through an inlet 79 which is then sealed by an inlet plug 80. A relief fitting 81 prevents the build-up of excessive pressure within the housing 54. It has been found that the rotation of the roller bearing antifriction members 55 and 56 in response to the rotation of the shaft 51 causes a pumping action which pumps the oil contained in the space between the antifriction members 55 and 56 through the bearings and into the adjacent areas. Therefore, the first and second antifriction support members 55 and 56 of FIG. 3 are by-passed by two by-pass passages 82 and 83, respectively. The by-pass passages 82 and 83 provide passages by which the oil pumped through the bearings is returned to the space between the antifriction support members 55 and 56.

A shoulder 84 on the outer periphery of the housing 54 adjacent the screw flight engages the aperture of the U-trough rear wall as was described with respect to FIG. 1 so as to seal the aperture. Optionally an O-ring may be used to increase the efficacy of the seal. The removable screw assembly 50 is preferably held in position on the material handling device by means of a clamp (not shown) which encircles the upper portion of part of the housing 54.

Figure 4:
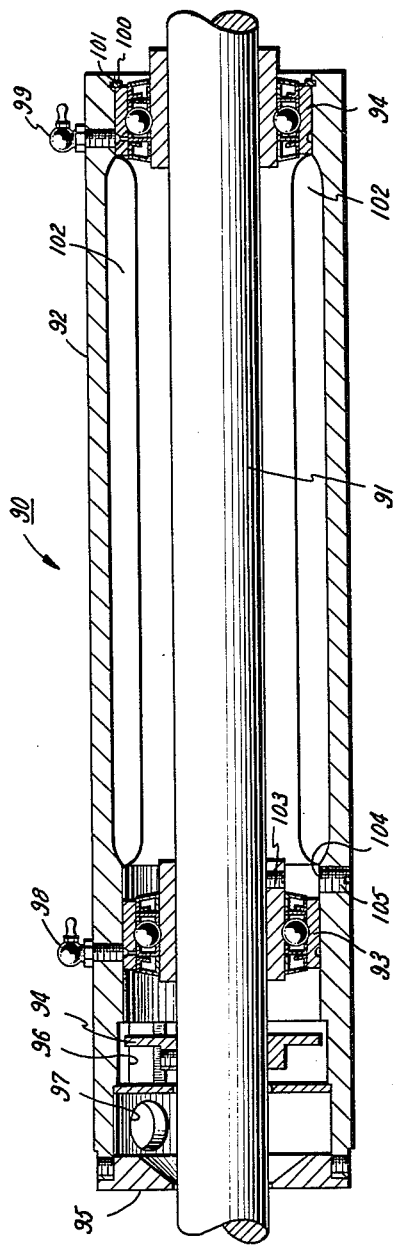
FIGURE 4 is a partial sectional view of another alternate embodiment of the invention utilizing a housing to connect the antifriction support members.

FIGURE 4 illustrates another alternate embodiment of the invention. A removable screw assembly 90, includes a drive shaft 91, only a portion of which is shown. The drive shaft 91 is enclosed by a housing 92. First and second antifriction support members 93 and 94 which may, for example, consist of Seal Master No. ER-24 ball bearings, support the shaft 91 within the housing 92. A slinger ring 94 and packing seal 95 and their respective access apertures 96 and 97 are similar to those described with respect to FIG. 3. In the embodiment of FIG. 4, the annular groove dirt seal has not been shown. For certain applications the use of this seal may be desirable with device of FIG. 4.

The ball bearings 93 and 94 are of the sealed type and grease fittings 98 and 99 provide a means for lubricating the bearings 93 and 94 respectively. A snap ring 100 engages a recess 101 in the inner periphery of the housing 92 adjacent the grease fitting 99 so as to hold the bearing 94 firmly in position against ribs 102 which are formed on the inner surface of the housing 92. The bearing 93 is fixed to the drive shaft 91 by means of a set screw 103, access to which is had through a threaded bore 104 extending through the housing 92 and normally closed by a threaded plug 105. The bearing 93 is not firmly fixed with respect to the housing 92, but rather may be subjected to slight relative motion therewith. Such relative motion allows for changes in the dimensions of the housing 92 with respect to the drive shaft 91 which may exist upon changes in temperature when material of construction of the housing 92 and the drive shaft 91 are not the same.

A shoulder 105 on the outer periphery of the housing 92 adjacent the screw flight (not shown, see FIG. 3) engages the aperture of the U-trough rear wall as was described with respect to FIG. 1 so as to seal the aperture. Optimally, an O-ring may be used to increase the efficacy of the seal. The removable screw assembly 90 is preferably held in position on the material handling device by means of a clamp (not shown) which encloses the upper portion of part of the housing 92.

I claim:
1. In a removable screw assembly of the type having a screw flight and a drive connection at opposite ends of a drive shaft and which is adapted to extend through an aperture in a material container wall, the combination of a packing seal enclosing the drive shaft between the screw flight and the drive connection, a plurality of antifriction support members positioned about the drive shaft between the packing seal and the drive connection so as to support the drive shaft, a seal ring disposed about the drive shaft between the packing seal and the screw flight, and means attaching the packing seal to the seal ring, said seal ring being insertable into said aperture to form a seal with said container wall.

2. The combination as defined in claim 1 and including a slinger ring attached to the drive shaft and positioned between the packing seal and the antifriction support member adjacent thereto.

3. The combination as defined in claim 2 in which the antifriction support members are sealed and including a base plate to which the antifriction support members are attached.

4. The combination as defined in claim 2 and including a housing connecting at least two antifriction support members so as to form an annular enclosed space therebetween concentric about the drive shaft.

5. The combination as defined in claim 4 and including a lubricant contained within said annular enclosed space and by-pass passages around the antifriction support members.

6. In a removable screw assembly of the type having a screw flight and a drive connection at opposite ends of a drive shaft, the combination of a packing seal positioned about the drive shaft adjacent the screw flight and having a sealing portion including an O-ring seal, the sealing portion being adapted to fit into a screw-removal aperture of a material handling device so that the O-ring seals the aperture, a first antifriction support member attached to the drive shaft adjacent the packing seal, a slinger ring mounted on the drive shaft between the first antifriction support member and the packing seal, and a second antifriction support member attached to the shaft between the drive connection and the first antifriction support member, the antifriction support members being adapted to support the drive shaft.

7. The combination as defined in claim 6, in which the antifriction support members are sealed, and including a base plate to which the antifriction support members are attached.

8. The combination as defined in claim 6 and including a housing connecting the two antifriction support members so as to form an annular enclosed space therebetween concentric about the drive shaft.

9. The combination as defined in claim 8 and including a lubricant contained within said annular enclosed space, and by-pass passages around the antifriction support members.

10. In a removable screw assembly of the type having a screw flight and a drive connection at opposite ends of a drive shaft, the combination of a housing surrounding a substantial portion of the drive shaft, a pair of bearing support members positioned within the housing and about the shaft so that the shaft is supported and freely rotatable within the housing and the space beween the bearing support members is enclosed, a slinger ring mounted on the drive shaft between the screw flight and the nearest bearing support member, a packing seal enclosing the drive shaft between the screw flight and the slinger ring, and an annular groove dirt seal mounted on the shaft between the screw flight and packing seal.

11. The combination as defined in claim 10 in which the bearing support members are roller bearings, and including a by-pass passage around each of the roller bearings, and a lubricant contained within the space between the roller bearings.

12. The combination as defined in claim 10 in which the bearing support members are sealed ball bearings.

13. In a removable screw assembly of the type having a screw flight and a drive connection at opposite ends of a drive shaft, the combination of a pair of sealed bearing support members of the antifriction type positioned about and supporting the drive shaft between the screw flight and the drive connection, a base plate to which the sealed bearing support members are attached, a slinger ring mounted on the shaft between the screw flight and the sealed bearing support member adjacent thereto, a packing seal enclosing the drive shaft between the screw flight and the slinger ring, and an annular groove dirt seal mounted on the shaft between the screw flight and the packing seal..

References Cited in the file of this patent

UNITED STATES PATENTS

| | | |
|---|---|---|
| 1,001,687 | Richards | Aug. 29, 1911 |
| 1,130,858 | Thomas | Mar. 9, 1915 |
| 1,145,516 | Schmid-Roost | July 6, 1915 |
| 1,607,222 | Wallgren | Nov. 16, 1926 |
| 2,135,308 | Killam | Nov. 1, 1938 |
| 2,556,392 | Hawk | June 12, 1951 |
| 2,891,655 | Saiberlich | June 23, 1959 |